United States Patent [19]

Takei et al.

[11] Patent Number: 5,264,174
[45] Date of Patent: Nov. 23, 1993

[54] PROCESS FOR PRODUCING COMPOSITELY REINFORCED POLYPROPYLENE RESIN COMPOSITION

[75] Inventors: Hiroshi Takei; Rikio Yonaiyama; Minoru Yoshimitsu; Nobukazu Atsumi, all of Ichihara, Japan

[73] Assignee: Mitsubishi Denki Kabushiki Kaisha, Tokyo, Japan

[21] Appl. No.: 955,033

[22] Filed: Oct. 1, 1992

[30] Foreign Application Priority Data

Oct. 7, 1991 [JP] Japan .................................. 3-285528

[51] Int. Cl.$^5$ .............................................. C08K 5/14
[52] U.S. Cl. ............................. 264/211.23; 264/211; 524/449; 524/494
[58] Field of Search ............... 524/449, 494; 264/211, 264/211.23, 331.17; 523/348

[56] References Cited

FOREIGN PATENT DOCUMENTS

| | | |
|---|---|---|
| 3520151 | 12/1986 | Fed. Rep. of Germany .................. 264/328.17 |
| 59-105042 | 6/1964 | Japan . |
| 52-36141 | 3/1977 | Japan . |
| 55-40719 | 3/1980 | Japan . |
| 58-206659 | 12/1983 | Japan . |
| 60-23432 | 2/1985 | Japan . |
| 64-11218 | 2/1989 | Japan . |

*Primary Examiner*—Veronica P. Hoke
*Attorney, Agent, or Firm*—Leydig, Voit & Mayer

[57] ABSTRACT

According to the present invention, there is provided a process for stably producing a compositely reinforced polypropylene composition having less warpage deformation and good moldability which includes the steps of using an extruder having at least three feed inlets, feeding an organic peroxide and a polypropylene resin selected from (a) a polypropylene modified by grafting an unsaturated organic acid thereonto, (b) a mixture of the resulting modified polypropylene and an unmodified polypropylene, (c) a mixture of an unsaturated organic acid and an unmodified polypropylene or (d) mixtures of the foregoing to the extruder through the first feed inlet of the extruder, feeding the lamellar inorganic filler thereto through the second feed inlet disposed at a position where the resin mixture is sufficiently melted and kneaded, feeding the glass fiber through the third feed inlet, and then melting and kneading these materials.

24 Claims, 1 Drawing Sheet

PROCESS FOR PRODUCING COMPOSITELY REINFORCED POLYPROPYLENE RESIN COMPOSITION

BACKGROUND OF THE INVENTION (i) Field of the Invention

The present invention relates to a process for producing a polypropylene resin composition which has excellent mechanical strength and stiffness and good dimensional stability and moldability and which is compositely reinforced by a glass fiber and a lamellar inorganic filler.

(ii) Description of the Prior Art

A polypropylene resin composition reinforced with a glass fiber is excellent in chemical resistance and has a higher reinforcing effect as compared with compositions reinforced with another particle filler or lamellar inorganic filler. In the polypropylene resin composition containing 10% by weight or more of the glass fiber, strength and stiffness are particularly high, and so this kind of polypropylene resin composition is used in many fields as a useful industrial material. However, the polypropylene resin composition reinforced with only glass fiber has the drawback that molded articles obtained therefrom have large warpage deformation.

In order to remove this drawback, Japanese Patent Publication No. 64-11218 and Japanese Patent Application laid-open No. 58-206659 disclose the following three processes (1) to (3) which comprise quantitatively feeding a glass fiber and a lamellar inorganic filler to the polypropylene, melting, kneading and extruding it to compositely reinforce it.

(1) A process which comprises first melting, kneading and extruding a mixture of a polypropylene, an organic peroxide and an unsaturated organic acid to obtain the polypropylene (hereinafter abbreviated to "modified PP" on occasion) on which the unsaturated organic acid is grafted, mixing this modified PP with predetermined amounts of a lamellar inorganic filler and a glass fiber, and then melting, kneading and extruding the mixture again.

(2) A process which comprises feeding a mixture of a modified PP and a lamellar filler to an extruder through the first feed inlet of the extruder on an upstream side, and then melting, kneading and extruding the mixture while a glass fiber is fed to the extruder through the second feed inlet of the extruder on a downstream side. The extruder for use in this process is equipped with the second feed inlet through which the other raw materials are fed to a position where the modified PP can be sufficiently melted.

(3) A process which comprises quantitatively feeding the modified PP alone through the first feed inlet on the upstream side of an extruder, and then melting, kneading and extruding the mixture, while a glass fiber and a lamellar inorganic filler are fed through the second feed inlet of the extruder on the downstream side.

However, in the process in which the mixture of the modified PP, the glass fiber and the lamellar inorganic filler or the mixture of the modified PP and the lamellar inorganic filler is fed through one feed inlet as in the above-mentioned processes (1) and (2), the viscosity of the resin noticeably increases in the melting step of the resin, so that a screw in the extruder is extraordinarily worn, with the result that the continuous production is practically impossible. In addition, bridges are formed in the vicinity of the feed inlet, and the composition of the product changes by classification, and in consequence, the stability of the production is very poor.

Furthermore, in the above-mentioned process (3), there is no problem, when small amounts of the glass fiber and the lamellar inorganic filler are used. However, when both the raw materials are fed in large quantities, the bridges are formed in the vicinity of the feed inlets. In consequence, the precision of the quantitative feed lowers, so that surging and the breakage of strands often take place. In particular, it is substantially impossible to continuously produce a polypropylene resin composition containing 10% by weight or more of the glass fiber and 20% by weight or more of the lamellar inorganic filler.

In all of the above-mentioned processes (1), (2) and (3), the composition change noticeably occurs owing to classification in a hopper of the extruder, so that the product having non-uniform composition can be merely obtained. Particularly, in the case of the process (1), the strength of the product significantly deteriorates owing to the breakage of the glass fibers.

Next, reference will be made to a relation between the melt flowability and the dimensional stability of the polypropylene resin composition compositely reinforced with the glass fiber and the lamellar inorganic filler.

In general, when the glass fiber and the lamellar inorganic filler are used at high concentrations in the polypropylene, the melt viscosity of the composition increases, and the flowability, i.e., melt flow rate (hereinafter abbreviated to "MFR" on occasion) of the composition noticeably decreases. When the composition having MFR of less than 10 g/10 minutes is injection-molded, the pressure in a mold lowers at the time of the molding, even if a fairly large injection pressure is applied. In consequence, the moldability of the composition deteriorates, with the result that the effect of warpage inhibition is outstandingly impaired.

Furthermore, as a result of the extreme deterioration of the flowability, the resin does not flow to the edges of the mold and is very poor in moldability, unless the injection pressure and the molding temperature in the molding step are increased.

In order to prevent this deterioration of the flowability, it is required to substantially increase the MFR of the modified PP which is the matrix resin. However, when the modified PP having the extremely high MFR is manufactured by means of an extruder, the strands are often cut owing to the shortage of melt tension and the strands fuse to each other, so that productivity declines.

SUMMARY OF THE INVENTION

In view of such situations, an object of the present invention is to provide a process for stably and inexpensively producing a compositely reinforced polypropylene resin composition containing 10% by weight or more of a glass fiber and 20% by weight or more of a lamellar inorganic filler, having an MFR of 10 g/10 minutes or more (230° C., 10 minutes and a load of 2.16 kg), excellent strength, stiffness and moldability as well as less warpage deformation.

The present inventors have made investigation in order to solve the above-mentioned problems, and as a result, they have succeeded in obtaining a desired compositely reinforced polypropylene resin composition by using an extruder having three feed inlets, feeding a specific resin mixture to the extruder through the first feed inlet of the extruder, feeding a lamellar inorganic filler thereto through the second feed inlet, feeding a glass fiber thereto through the third feed inlet, and then melting and kneading these materials. In consequence, the process of the present invention has been completed.

That is, the present invention is directed a process for producing a compositely reinforced polypropylene resin composition containing 10% by weight or more of a glass fiber and 20% by weight or more of a lamellar inorganic filler and having a melt flow rate of 10 g/10 minutes or more (230° C., 10 minutes and a load of 2.16 kg) which comprises the steps of using an extruder having three feed inlets, feeding a polypropylene modified by grafting an unsaturated organic acid thereonto (a modified PP), a mixture of the modified PP and an unmodified polypropylene, or a mixture of an unsaturated organic acid, an unmodified polypropylene and an organic peroxide, to the extruder through the first feed inlet of the extruder, feeding the lamellar inorganic filler thereto through the second feed inlet disposed at a position where the resin mixture is sufficiently melted and kneaded, feeding the glass fiber thereto through the third feed inlet, and then melting and kneading these materials.

Figure 1:
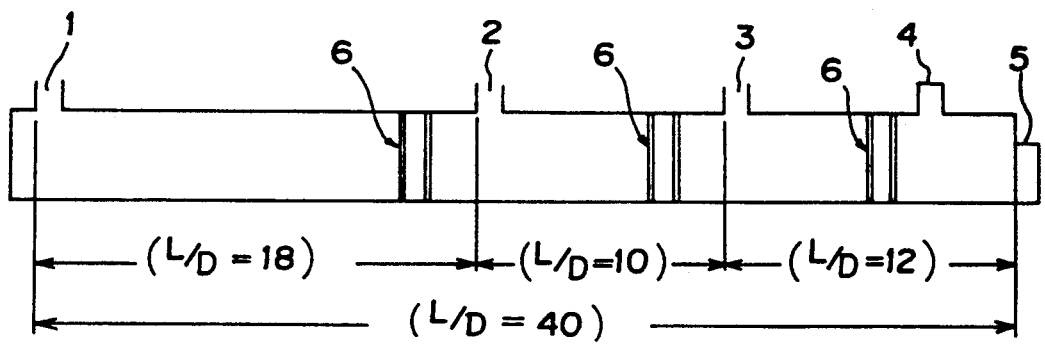
FIG. 1 is an illustrative view of a co-rotating twin screw extruder (A) having three feed inlets.

1 ... First feed inlet
2 ... Second feed inlet
3 ... Third feed inlet
4 ... Vent
5 ... Die
6 ... Kneading disk

DETAILED DESCRIPTION OF PREFERRED EMBODIMENTS

As an extruder for use in a process of the present invention, there can be used a commercially available screw extruder, so long as it has three or more feed inlets, but a co-rotating twin screw extruder is particularly preferable. Furthermore, it is preferred that a feeder with a meter is provided at each feed inlet to control the amount of each feed material.

No particular restriction is put on a ratio (L/D) of a length L of a cylinder to a diameter D of a die of the extruder, but for example, in the range of from the first feed inlet for the feed of a resin mixture to the second feed inlet for the feed of a lamellar inorganic filler, the ratio is 15 or more; in the range of from the second feed inlet to the third feed inlet for the feed of a glass fiber, the ratio is 7 or more; and in the range of from the third feed inlet to the die, the ratio is from 10 to about 15.

When the ratio L/D in the range of from the first feed inlet to the second feed inlet is too low, an organic peroxide does not function effectively, and the flowability of the mixture deteriorates. Moreover, in the case that an unsaturated organic acid is used, graft reaction is insufficient, so that interfacial adhesive properties between the glass fiber or the lamellar inorganic filler and a modified PP decline, with the result that strength and stiffness of the product decrease.

The ratio L/D of from the second feed inlet to the third inlet is required to have a value enough to sufficiently disperse the lamellar inorganic filler, and when this ratio is too low, the glass fiber is fed to the insufficiently dispersed lamellar inorganic filler, so that the glass fiber is not uniformly blended, which results in the deterioration of productivity.

Furthermore, when the ratio L/D in the range of from the third feed inlet to the die is too low, the dispersibility of the glass fiber is poor, so that the strength decreases, and, conversely, when the ratio is too high, the glass fiber is broken, so that the strength decreases similarly.

In order to effectively achieve the function of the organic peroxide and to improve the dispersion of inorganic fillers such as mica and the glass fiber, it is preferable to employ a high-performance kneading means such as a Dulmage screw and a kneading disk between the respective feed inlets and between the third feed inlet and the die of the extruder.

Furthermore, for the purpose of stabilizing strands and inhibiting the generation of air bubbles in pellets, it is preferable to dispose a vent between the third feed inlet and the die of the extruder.

In the process of the present invention, the extrusion temperature of the extruder is preferably in the range of from about 180° to 300° C., more preferably from about 200° to 280° C.

In the process of the present invention, the utilization effect of the extruder can be exerted only by feeding the above-mentioned resin mixture to the extruder through the first feed inlet on the most upstream side, feeding the lamellar inorganic filler thereto through the second feed inlet, and then feeding the glass fiber thereto through the third feed inlet.

If the resin mixture, the glass fiber and the lamellar inorganic filler are fed to the extruder through the first feed inlet, the second feed inlet and the third feed inlet, respectively, the glass fiber is noticeably broken at the time of melting and kneading, so that the strength of the resultant resin composition extremely deteriorates.

Furthermore, when the mixture of the resin mixture and the lamellar inorganic filler is fed to the extruder through the first feed inlet and nothing is fed thereto through the second feed inlet and the glass fiber is fed thereto through the third feed inlet, a production stability lowers owing to the formation of bridges and the like in the vicinity of the feed inlets, and the viscosity of the mixture of the resin mixture and the lamellar inorganic filler noticeably increases in the melting step, so that a screw in the extruder is outstandingly worn. Particularly, when the lamellar inorganic filler is mica, the continuous production is practically impossible. Additionally, in this process, the blended organic peroxide and unsaturated organic acid are adsorbed by the inorganic filler, before they act on the polypropylene. In consequence, there also occurs a problem that the moldability, strength and stiffness of composition are impaired.

Moreover, when the resin mixture is fed to the extruder through the first feed inlet and nothing is fed thereto through the second feed inlet and the mixture of the lamellar inorganic filler and the glass fiber is fed thereto through the third feed inlet, bridges are easily formed in the vicinity of the feed inlets with the accumulative increase of the fed lamellar inorganic filler and glass fiber. In consequence, the precision of the quantitative feed lowers, so that surging and strand breakage often take place.

The compositely reinforced polypropylene resin composition obtained by the process of the present invention is excellent in strength and stiffness, and so it can be directly molded without any additional treatment. Prior to the molding, however, the composition can be mixed with a non-reinforced resin, i.e., unmodified polypropylene or a modified PP in an optional ratio.

On the other hand, as a means for including the filler in the resin at a high concentration, a melting/kneading technique using a kneader or the like is prevalent. However, in such a technique, the breakage of the glass fiber is perceptible, so that the excellent strength and stiffness cannot be obtained.

The process of the present invention is only limited to the manufacture of a compositely reinforced polypropylene resin composition containing 10% by weight or more of the glass fiber and 20% by weight or more of the lamellar inorganic filler and having an MFR of 10 g/10 minutes or more.

When the amount of the glass fiber to be added is less than 10% by weight, the excellent strength cannot be obtained, and hence applications of the products are strictly restricted. Additionally, when the amount of the lamellar inorganic filler to be added is less than 20% by weight, the inhibition effect of warpage deformation is noticeably impaired. Furthermore, when the MFR of the composition is less than 10 g/10 minutes, moldability deteriorates and the inhibition effect of the warpage deformation is also noticeably impaired.

No particular restriction is put on the kind of lamellar inorganic filler which is used in the process of the present invention, but examples of the lamellar inorganic filler include mica, talc and glass flakes. Above all, mica is particularly preferable. The amount of the lamellar inorganic filler is 20% or more, preferably from 20 to 45% by weight based on the weight of the resin composition.

Examples of the glass fiber which is used in the process of the present invention include glass chopped strands and glass rovings which are usually commercially available as additives for reinforcing resins. Preferably, with regard to the glass fiber, an average fiber diameter is from 5 to 20 μm, and an average fiber length, in the case of the glass chopped strands, is from 0.5 mm to 10 mm. No particular restriction is put on the amount of the glass fiber, so long as it is 10% by weight or more, but it is preferably in the range of from 10 to 35% by weight.

Next, reference will be made to the unmodified polypropylene, the organic peroxide, the unsaturated organic acid and the modified PP the components of the resin mixture for use in the process of the present invention may be selected.

Examples of the unmodified polypropylene include a homopolymer of propylene and block and random copolymers of propylene and one or more of α-olefins such as ethylene, 1-butene, 1-hexene and 1-octene, etc.

No particular restriction is put on the kind of organic peroxide, but examples include di-t-butyl peroxide, dicumyl peroxide and benzoyl peroxide. No particular restriction is put on the amount of the organic peroxide, but it is preferably from 0.01 to 0.5% by weight based on the weight of the unmodified polypropylene.

Furthermore, the organic peroxide is necessary, even when either of the unsaturated organic acid and the modified PP is used.

The organic peroxide has the effect of cutting the molecular chains of the polypropylene to improve the flowability of the resultant resin composition. The improvement of the flowability results in the preparation of the resin composition having less warpage deformation and excellent moldability. Moreover, when an unsaturated organic acid is used, the organic peroxide permits obtaining the above-mentioned flowability and completing the graft reaction of the unsaturated organic acid on the polypropylene, so that the resin composition having excellent strength and stiffness can be obtained.

No particular restriction is put on the kind of unsaturated organic acid, but examples include unsaturated carboxylic acids and their anhydrides such as acrylic acid, methacrylic acid, maleic acid, fumaric acid, citraconic acid, maleic anhydride and itaconic anhydride. No particular restriction is put on the amount of the unsaturated organic acid, but it is preferably in the range of from 0.01 to 5% by weight based on the weight of the unmodified polypropylene.

The modified PP can be obtained by grafting the above-mentioned unsaturated organic acid on the unmodified polypropylene in a known suitable manner. For example, there are a process in which a mixture of the unmodified polypropylene, the unsaturated organic acid and the organic peroxide is melted and kneaded, and then pelletized by the extruder, and a process in which the above-mentioned mixture is reacted in a solvent such as xylene.

Furthermore, when the modified PP is used, the amount of the unsaturated organic acid in the total components of the modified PP and the unmodified polypropylene is suitably in the range of from 0.01 to 5% by weight. When the amount of this unsaturated organic acid is less than 0.01% by weight, the resin composition having sufficiently high strength cannot be obtained.

In the resin mixture for use in the process of the present invention, there can be used, if necessary, an antioxidant, an ultraviolet light absorber, a lubricant, a silane coupling agent and the like.

When neither the modified PP nor the unsaturated organic acid is contained in the resin mixture, good interfacial adhesion cannot be obtained between the glass fiber or the lamellar inorganic filler and the resin, so that the strength and stiffness of the composition largely deteriorate.

The process of the present invention can stably and inexpensively provide a compositely reinforced polypropylene resin composition which is reinforced with a glass fiber and a lamellar inorganic filler and which has excellent strength, stiffness and moldability as well as less warpage deformation.

EXAMPLES

Next, the present invention will be described in detail with reference to examples and comparative examples, but it should not be limited to these examples.

Figure 2:
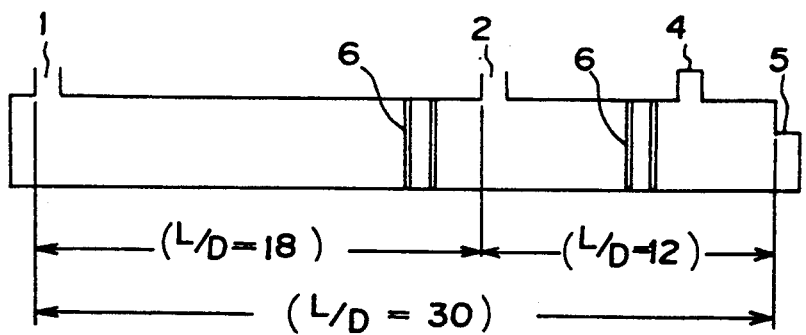
FIG. 2 is an illustrative view of a co-rotating twin screw extruder (B) having two feed inlets.

In the examples of the present invention and the comparative examples, evaluation was carried out by the use of extruders shown in FIGS. 1 and 2.

The extruder (A) shown in FIG. 1 is a co-rotating twin screw extruder equipped with three feed inlets and a vent and having a bore diameter of 45 mm. A ratio (L/D) of a length L of a cylinder to a diameter D of a die is 40 in the whole extruder, 18 in the range of from the first feed inlet 1 to the second feed inlet 2, 10 in the range of from the second feed inlet 2 to the third feed inlet 3, and 12 in the range of from the third feed inlet 3 to the die. Kneading disks 6 are disposed between the first feed inlet 1 and the second feed inlet 2, between the second feed inlet 2 and the third feed inlet 3 and between the third feed inlet 3 and the die 5, respectively.

Furthermore, the extruder (B) shown in FIG. 2 is a co-rotating twin screw extruder equipped with two feed inlets and a vent and having a bore diameter of 45 mm. The ratio (L/D) is 30 in the whole extruder, 18 in the range of from the first feed inlet to the second feed inlet, and 12 in the range of from the second feed inlet to the die. The kneading disks 6 are disposed between the first feed inlet and the second feed inlet, and between the second feed inlet and the die, respectively.

In the examples and comparative examples, the measurement of the MFR and a graft ratio as well as the evaluation of the resin compositions were carried out by the following procedures.

Graft ratio

Pellets of a modified PP were dissolved in xylene at 135° C., and the resultant solution was then poured into a large amount of acetone to precipitate a polypropylene component. Unreacted maleic anhydride was removed therefrom, and the solution was filtered and then dried. This dried modified PP was then subjected to infrared spectral analysis, and grafted maleic anhydride was quantitatively analyzed from a peak at 1780 cm$^{-1}$ of an infrared spectral analysis spectrum, thereby obtaining the graft ratio.

Measurement of tensile strength (which was carried out in accordance with JIS K7113).

Measurement of flexural modulus (which was carried out in accordance with JIS K7203).

Measurement of MFR (230° C., 10 minutes, load of 2.16 kg).

Measurement of warpage deformation (maximum warpage deformation): Test pieces for the test were prepared by injection-molding a 2-mm-thick, 150-mm-long, 150-mm-wide plate, utilizing one whole surface thereof as a film gate. These test pieces were conditioned at 23° C. at a relative humidity of 50% for 48 hours. Afterward, both the corners of one side of each test piece were fixed on a horizontal base, and a distance of the separated opposite side from the horizontal base was then measured as the warpage deformation. However, the warpage deformation was changed by altering the side position of each test piece which was fixed, and therefore the measurement of the warpage deformation was carried out while the side positions of the test piece to be fixed were changed. Of the measured values, the maximum value was regarded as the warpage deformation, and its unit was mm.

The resin mixtures and the modified PP which would be used in the examples and comparative examples were prepared as follows.

(1) Resin mixture 1: This resin mixture was obtained by stirring a mixture of 99.20% by weight of a polypropylene homopolymer powder having an MFR of 2 g/10 minutes as an unmodified polypropylene, 0.5% by weight of maleic anhydride as an unsaturated organic acid, 0.1% by weight of 1,3-bis(t-butylperoxyisopropyl)benzene as an organic peroxide, 0.1% by weight of 2,6-di-t-butyl-p-cresol as an antioxidant and 0.1% by weight of calcium stearate as a lubricant for the mixer.

(2) Modified PP-2: The above-mentioned resin mixture 1 was melted and kneaded at an extrusion temperature of 200° C., and then pelletized by the use of an extruder (B).

The thus obtained modified PP-2 had an MFR of 130 g/10 minutes and a graft ratio of 0.3% by weight.

(3) Modified PP-3 (highly graft-modified PP): A mixture of 94.5% by weight of a polypropylene homopolymer powder having an MFR of 2 g/10 minutes as an unmodified polypropylene, 5.0% by weight of maleic anhydride as an unsaturated organic acid and 0.5% by weight of 1,3-bis(t-butyl-peroxyisopropyl)benzene as an organic peroxide was reacted at 100° C. for 2 hours in xylene, and the reaction solution was then precipitated in acetone, filtered and then dried.

The obtained modified PP had an MFR of 130 g/10 minutes and a graft ratio of 0.3% by weight.

(4) Resin Mixture 4 (a resin mixture containing an organic peroxide and a stabilizer only): This resin mixture was obtained by stirring a mixture of 99.70% by weight of a polypropylene homopolymer powder having an MFR of 2 g/10 minutes as an unmodified polypropylene, 0.1% by weight of 1,3-bis(t-butylperoxyisopropyl)benzene as an organic peroxide, 0.1% by weight of 2,6-di-t-butyl-p-cresol as an antioxidant and 0.1% by weight of calcium stearate as a lubricant for the mixer.

(5) Resin Mixture 5 (a resin mixture containing a stabilizer only): This resin mixture was obtained by stirring a mixture of 99.8% by weight of a polypropylene homopolymer powder having an MFR of 30 g/10 minutes, 0.1% by weight of 2,6-di-t-butyl-p-cresol as an antioxidant and 0.1% by weight of calcium stearate as a lubricant for the mixer.

As a lamellar inorganic filler, mica having an aspect ratio of 35 was used. As a glass fiber, chopped strands having an average fiber length of 3 mm and an average fiber diameter of 9 μm were used. A temperature in the extruder was set to 250° C.

EXAMPLE 1

50% by weight of a resin mixture, 30% by weight of mica and 20% by weight of a glass fiber were quantitatively fed to an extruder (A) shown in FIG. 1 through the first feed inlet, the second feed inlet and the third feed inlet of the extruder (A), respectively. Afterward, they were melted and kneaded under vent suction, and then pelletized.

COMPARATIVE EXAMPLE 1

The same procedure as in Example 1 was carried out except that the feed order of a glass fiber and a lamellar inorganic filler was reversed.

COMPARATIVE EXAMPLE 2

A mixture obtained by mixing 50% by weight of modified PP-2, 20% by weight of a glass fiber and 30% by weight of mica by a mixer was fed to an extruder (B) shown in FIG. 2 through the first feed inlet of the extruder, and nothing was fed thereto through the second and third feed inlets, and the mixture was then melted and kneaded, and then pelletized under vent suction to prepare a composition in the form of the pellets.

However, during the preparation, bridges were often formed at the feed inlets for the raw materials, so that the raw materials were not stably fed. Thus, the preparation process was continued, while the bridges were removed by poking them with a resin rod. By this operation, strands were substantially stabilized, but a little while later, surging occurred instead. Hence, a screw was drawn and then inspected, and as a result, it was apparent that the portion of the extruder in the vicinity of a kneading disk was noticeably worn. Therefore, the production was stopped.

COMPARATIVE EXAMPLE 3

A mixture obtained by mixing 50% by weight of modified PP-2 and 30% by weight of mica by a mixer was quantitatively fed to an extruder (B) shown in FIG. 2 through the first feed inlet of the extruder, and 20% by weight of a glass fiber were quantitatively fed thereto through the second feed inlet. Afterward, the mixture was melted and kneaded, and then pelletized under vent suction.

Immediately after the start of the preparation, the modified PP and mica were classified in the first feed inlet, and strands were often cut by surging attributed to the fluctuation of the composition. A little while later, the surging grew vigorous and the operation became impossible, as in Comparative Example 2. Thus, a screw was drawn and then inspected, and as a result, it was apparent that the portion of the extruder in the vicinity of a kneading disk was noticeably worn. Therefore, the production was stopped.

COMPARATIVE EXAMPLE 4

70% by weight of modified PP-2 was quantitatively fed to an extruder (B) shown in FIG. 2 through the first feed inlet of the extruder, and a mixture obtained by mixing 10% by weight of a glass fiber and 20% by weight of mica by a mixer was quantitatively fed thereto through the second feed inlet. Afterward, the mixture was melted and kneaded, and then pelletized under vent suction.

In this example, the amounts of the glass fiber and mica were less than in the other examples, but many bridges were formed at the second feed inlet, so that the glass fiber and mica were not stably fed and strands were often cut. Therefore, the production was unavoidably stopped.

EXAMPLE 2

5% by weight of modified PP-3 and 45% by weight of a resin mixture 4 (including an organic peroxide and a stabilizer only) were quantitatively fed to an extruder (A) shown in FIG. 1 through the first feed inlet of the extruder, and 30% by weight of mica and 20% by weight of a glass fiber were fed thereto through the second feed inlet and the third feed inlet, respectively. Afterward, the mixture was melted and kneaded, and then pelletized under vent suction.

COMPARATIVE EXAMPLE 5

A mixture obtained by mixing 5% by weight of modified PP-3 and 45% by weight of a resin mixture 5 (containing a stabilizer only) by a mixer was quantitatively fed to an extruder (A) shown in FIG. 2 through the first feed inlet of the extruder, and 30% by weight of mica and 20% by weight of a glass fiber were quantitatively fed thereto through the second feed inlet and the third feed inlet, respectively. Afterward, the mixture was melted and kneaded, and then pelletized under vent suction.

COMPARATIVE EXAMPLE 6

50% by weight of a resin mixture 4 (containing an organic peroxide and a stabilizer only), 30% by weight of mica and 20% by weight of a glass fiber were quantitatively fed to an extruder (A) shown in FIG. 1 through the first feed inlet, the second feed inlet and the third feed inlet of the extruder, respectively. Afterward, the mixture was melted and kneaded, and then pelletized under vent suction. The results are set forth in Table 1.

EXAMPLE 3

30% by weight of a resin mixture 1, 35% by weight of mica and 35% by weight of a glass fiber were quantitatively fed to an extruder (A) shown in FIG. 1 through the first feed inlet, the second feed inlet and the third feed inlet of the extruder, respectively. Afterward, the mixture was melted and kneaded, and then pelletized under vent suction. The results are set forth in Table 1.

Raw materials feed conditions in the examples and comparative examples are set forth in Table 1, and the evaluation results of the resin compositions are set forth in Table 2.

TABLE 1

(I) Feed Conditions of Raw Material First Feed Inlet

|  | Kind of Extruder | Raw Material | Amount (wt %) |
| --- | --- | --- | --- |
| Example 1 | A | Resin Mixture 1 | 50 |
| Comparative Example 1 | A | Resin Mixture 1 | 50 |
| Comparative Example 2 | B | Modified PP-2 | 50 |
| Example 2 | | Mica | 30 |
| | | Glass Fiber | 20 |
| Comparative Example 3 | B | Modified PP-2 | 50 |
| | | Mica | 30 |
| Comparative Example 4 | B | Modified PP-2 | 70 |
| Example 2 | A | Modified PP-3 | 5 |
| | | Resin Mixture 4 | 45 |
| Comparative Example 5 | A | Modified PP-3 | 5 |
| | | Resin Mixture 5 | 45 |
| Comparative Example 6 | A | Resin Mixture 4 | 50 |
| Example 3 | A | Resin Mixture 1 | 30 |

TABLE 1

(II) Feed Conditions of Raw Material Second Feed Inlet

|  | Kind of Extruder | Raw Material | Amount (wt %) |
| --- | --- | --- | --- |
| Example 1 | A | Mica | 30 |
| Comparative Example 1 | A | Glass Fiber | 20 |
| Comparative Example 2 | B | — | — |
| Comparative Example 3 | B | Glass Fiber | 20 |
| Comparative Example 4 | B | Glass Fiber | 10 |
| | | Mica | 20 |
| Example 2 | A | Mica | 30 |
| Comparative Example 5 | A | Mica | 30 |
| Comparative Example 6 | A | Mica | 30 |
| Example 3 | A | Mica | 35 |

TABLE 1

(III) Feed Conditions of Raw Material Third Feed Inlet

|  | Kind of Extruder | Raw Material | Amount (wt %) |
| --- | --- | --- | --- |
| Example 1 | A | Glass Fiber | 20 |
| Comparative Example 1 | A | Mica | 30 |
| Comparative Example 2 | B | — | — |

TABLE 1-continued

(III) Feed Conditions of Raw Material Third Feed Inlet

| | Kind of Extruder | Raw Material | Amount (wt %) |
|---|---|---|---|
| Comparative Example 3 | B | — | — |
| Comparative Example 4 | B | — | — |
| Example 2 | A | Glass Fiber | 20 |
| Comparative Example 5 | A | Glass Fiber | 20 |
| Comparative Example 6 | A | Glass Fiber | 20 |
| Example 3 | A | Glass Fiber | 35 |

TABLE 1

(IV) Results of Evaluation

| | Kind of Extruder | Tensile Strength (kg/cm$^2$) | Flexural Modulus (kg/cm$^2$) |
|---|---|---|---|
| Example 1 | A | 1300 | 120000 |
| Comparative Example 1 | A | 640 | 62000 |
| Comparative Example 2 | A | Stable Production was impossible. | |
| Comparative Example 3 | B | Stable Production was impossible. | |
| Comparative Example 4 | B | Stable Production was impossible. | |
| Example 2 | A | 1250 | 118000 |
| Comparative Example 5 | A | 980 | 95000 |
| Comparative Example 6 | A | 520 | 101000 |
| Example 3 | A | 1650 | 138000 |

TABLE 1

(V) Results of Evaluation

| | Kind of Extruder | Tensile Strength (kg/cm$^2$) | Flexural Modulus (kg/cm$^2$) |
|---|---|---|---|
| Example 1 | A | 30 | 1.5 |
| Comparative Example 1 | A | 30 | 2.0 |
| Comparative Example 2 | A | Stable Production was impossible. | |
| Comparative Example 3 | B | Stable Production was impossible. | |
| Comparative Example 4 | B | Stable Production was impossible. | |
| Example 2 | A | 28 | 1.6 |
| Comparative Example 5 | A | 0.5 | 70.0 |
| Comparative Example 6 | A | 26 | 2.5 |
| Example 3 | A | 15 | 1.0 |

As is apparent from Table 1, with regard to the product obtained in Example 1 concerning the process of the present invention, tensile strength and flexural modulus were excellent and they were 1300 kg/cm$^2$ and 12000 kg/cm$^2$, respectively. Furthermore, MFR was as high as 30 g/10 minutes, and so warpage deformation was also at a good level of 1.5 mm. In addition, after the production, wear of the screw was not observed at all, and a stable feed condition of the raw materials was also excellent.

Comparative Example 1 is an example in which the same raw materials as in Example 1 were used and the feed order of the glass fiber and mica was reversed. In the case of such a feed order, MFR and warpage deformation were not so different from those of Example 1, but since the glass fiber was broken, tensile strength and flexural modulus deteriorated to about half of those of Example 1.

In short, the effect of the present invention can be exerted only when the resin mixture, the lamellar inorganic filler and the glass fiber were fed to the extruder through the first feed inlet on the most upstream side, the second feed inlet and the third feed inlet, respectively.

Comparative Examples 2 to 4 are examples in which conventional procedures were used, but in all of these examples, the stable production was difficult and so the production was stopped halfway.

Firstly, in Comparative Example 2, the bridges were formed at the raw material feed inlets, and the raw materials could not be stably fed. In addition, during the production, the surging occurred. Thus, a screw was drawn and then inspected, and as a result, it was apparent that the portion of the extruder in the vicinity of a kneading disk was noticeably worn.

Also in Comparative Example 4, the fluctuation of the feed composition occurred in the first feed inlet owing the classification, so that stable production could not be achieved. In addition, the screw was noticeably worn.

Moreover, in Comparative Example 4, the amounts of the glass fiber and mica were 10% by weight and 20% by weight, respectively, and these amounts were smaller than in the other examples. Nevertheless, the bridges were outstandingly formed at the third feed inlet, so that the glass fiber and mica could not be stably fed.

In short, the conventional process could not practically produce a polypropylene resin composition compositely reinforced with 10% by weight or more of the glass fiber and 20% by weight or more of the lamellar inorganic filler.

Example 2 and Comparative Example 5 were examples for comparing the blend effect of the organic peroxide. In these examples, the amount of the modified PP in the matrix was equal, but in Example 2 in which the organic peroxide was added, MFR was 28 g/10 minutes, and the warpage deformation was 1.6 mm. On the contrary, in Comparative Example 5 in which the organic peroxide was not added and the highly graft-modified PP was diluted with the unmodified PP having an MFR of 30 g/10 minutes, MFR extremely deteriorated to 0.5 g/10 minutes, so that the warpage deformation inconveniently increased to 70 mm. In addition, tensile strength and flexural modulus also noticeably declined.

This can be presumed to be due to the fact that even if the polypropylene having the high MFR was used, the viscosity of the polypropylene increased owing to the blend of the glass fiber and mica, and the breakage of the glass fiber was inevitable.

Comparative Example 6 is an example in which the organic peroxide was only contained in the matrix resin and neither the unsaturated organic acid nor the modified PP was contained.

In this case, the interfacial adhesion was not present between the resin and the fillers, and so the strength of the product was extremely low.

Example 3 is an example which succeeded in the composite packing of the glass fiber and the lamellar inorganic filler at a high concentration, in contrast to the conventional process.

In short, the conventional process could not practically provide the stable production, even if the amounts of the glass fiber and the lamellar inorganic filler were as low as in Comparative Examples 2 to 4. On the contrary, in Example 3 utilizing the process of the present invention, stable production was possible and wear of the screw was not observed at all after the production, even if the amount of the glass fiber was 35% by weight, that of mica were 35% by weight, and its total amount was 70% by weight.

What is claimed is:

1. A process for producing a compositely reinforced polypropylene resin composition containing at least 10% by weight of a glass fiber and at least 20% by weight of a lamellar inorganic filler and having a melt flow rate of at least 10 g/10 minutes (230° C., 10 minutes and a load of 2.16 kg) comprising the steps of feeding, using an extruder having at least three feed inlets, an amount of organic peroxide sufficient to shorten molecular chains and a polypropylene resin selected from the group consisting of (a) a polypropylene modified by grafting an unsaturated organic acid thereonto, (b) a mixture of said modified polypropylene and an unmodified polypropylene, (c) a mixture of an unsaturated organic acid and an unmodified polypropylene, and (d) mixtures of the foregoing to the extruder through the first feed inlet of the extruder, feeding the lamellar inorganic filler thereto through the second feed inlet disposed at a position where the resin mixture is sufficiently melted and kneaded, feeding the glass fiber thereto through the third feed inlet, and then melting and kneading these materials.

2. The process for producing a compositely reinforced polypropylene resin composition according to claim 1 wherein the lamellar inorganic filler is mice.

3. The process for producing a compositely reinforced polypropylene resin composition according to claim 1 wherein a mixture of a polypropylene modified by grafting an unsaturated organic acid thereonto, an unmodified polypropylene, and an organic peroxide is fed to the extruder through the first feed inlet of the extruder.

4. The process for producing a compositely reinforced polypropylene resin composition according to claim 1 wherein a mixture of an unsaturated organic acid, an unmodified polypropylene, and an organic peroxide is fed to the extruder through the first feed inlet of the extruder.

5. The process for producing a compositely reinforced polypropylene resin composition according to claim 4 wherein the amount of unsaturated organic acid is in the range of about 0.01 to 5% by weight, based on the weight of the unmodified polypropylene.

6. The process for producing a compositely reinforced polypropylene resin composition according to claim 3 wherein the amount of unsaturated organic acid is in the range of about 0.01 to 5% by weight, based on the total weight of modified and unmodified polypropylene.

7. The process for producing a compositely reinforced polypropylene resin composition according to claim 1 wherein the amount of lamellar inorganic filler is about 20 to about 45% by weight, based on the weight of the resin composition.

8. The process for producing a compositely reinforced polypropylene resin composition according to claim 1 wherein the amount of glass fibers is about 10 to about 35% by weight, based on the weight of the resin composition.

9. A process for producing a compositely reinforced polypropylene resin composition containing at least 10% by weight of a glass fiber and at least 20% by weight of a lamellar inorganic filler and having a melt flow rate of at least 10 g/10 minutes (230° C., 10 minutes and a load of 2.16 kg) comprising the steps of feeding, using an extruder having at least three feed inlets, an amount of organic peroxide sufficient to improve flowability of the polypropylene resin composition and a polypropylene resin selected from the group consisting of (a) a polypropylene modified by grafting an unsaturated organic acid thereonto, (b) a mixture of said modified polypropylene and an unmodified polypropylene, (c) a mixture of an unsaturated organic acid and an unmodified polypropylene, and (d) a mixture of the foregoing to the extruder through the first feed inlet of the extruder, feeding the lamellar inorganic filler thereto through the second feed inlet disposed at a position where the resin mixture is sufficiently melted and kneaded, feeding the glass fiber through the third feed inlet, and then melting and kneading these materials.

10. The process for producing a compositely reinforced polypropylene resin composition according to claim 9 wherein the lamellar inorganic filler is mica.

11. The process for producing a compositely reinforced polypropylene resin composition according to claim 9 wherein a mixture of a polypropylene modified by grafting an unsaturated organic acid thereonto, an unmodified polypropylene, and an organic peroxide is fed to the extruder through the first feed inlet of the extruder.

12. The process for producing a compositely reinforced polypropylene resin composition according to claim 9 wherein a mixture of an unsaturated organic acid, an unmodified polypropylene, and an organic peroxide is fed to the extruder through the first feed inlet of the extruder.

13. The process for producing a compositely reinforced polypropylene resin composition according to claim 12 wherein the amount of unsaturated organic acid is in the range of about 0.01 to 5% by weight, based on the weight of the unmodified polypropylene.

14. The process for producing a compositely reinforced polypropylene resin composition according to claim 11 wherein the amount of unsaturated organic acid is in the range of about 0.01 to 5% by weight, based on the total weight of modified and unmodified polypropylene.

15. The process for producing a compositely reinforced polypropylene resin composition according to claim 9 wherein the amount of lamellar inorganic filler is about 20 to about 45% by weight, based on the weight of the resin composition.

16. The process for producing a compositely reinforced polypropylene resin composition according to claim 9 wherein the amount of glass fibers is about 10 to about 35% by weight, based on the weight of the resin composition.

17. A process for producing a compositely reinforced polypropylene resin composition containing at least 10% by weight of a glass fiber and at least 20% by weight of a lamellar inorganic filler and having a melt flow rate of at least 10 g/10 minutes (230° C., 10 minutes and a load of 2.16 kg) comprising the steps of feeding, using an extruder having at least three feed inlets, at least 0.01% by weight of an organic peroxide and a polypropylene resin selected from the group consisting of (a) a polypropylene modified by grafting an unsaturated organic acid thereonto, (b) a mixture of said resulting modified polypropylene and an unmodified polypropylene, (c) a mixture of an unsaturated organic acid and an unmodified polypropylene, and (d) a mixture of the foregoing to the extruder through the first feed inlet of the extruder, feeding the lamellar inorganic filler thereto through the second feed inlet disposed at a position where the resin mixture is sufficiently melted and kneaded, feeding the glass fiber through the third feed inlet, and then melting and kneading these materials.

18. The process for producing a compositely reinforced polypropylene resin composition according to claim 17 wherein the lamellar inorganic filler is mica.

19. The process for producing a compositely reinforced polypropylene resin composition according to claim 17 wherein a mixture of a polypropylene modified by grafting an unsaturated organic acid thereonto, an unmodified polypropylene, and an organic peroxide is fed to the extruder through the first feed inlet of the extruder.

20. The process for producing a compositely reinforced polypropylene resin composition according to claim 17 wherein a mixture of an unsaturated organic acid, an unmodified polypropylene, and an organic peroxide is fed to the extruder through the first feed inlet of the extruder.

21. The process for producing a compositely reinforced polypropylene resin composition according to claim 20 wherein the amount of unsaturated organic acid is in the range of about 0.01 to 5% by weight, based on the weight of the unmodified polypropylene.

22. The process for producing a compositely reinforced polypropylene resin composition according to claim 17 wherein the amount of unsaturated organic acid is in the range of about 0.01 to 5% by weight, based on the total weight of modified and unmodified polypropylene.

23. The process for producing a compositely reinforced polypropylene resin composition according to claim 17 wherein the amount of lamellar inorganic filler is about 20 to about 45% by weight, based on the weight of the resin composition.

24. The process for producing a compositely reinforced polypropylene resin composition according to claim 17 wherein the amount of glass fibers is about 10 to about 35% by weight, based on the weight of the resin composition.

* * * * *

UNITED STATES PATENT AND TRADEMARK OFFICE
CERTIFICATE OF CORRECTION

PATENT NO. : 5,264,174
DATED : November 23, 1993
INVENTOR(S) : Takei et al.

It is certified that error appears in the above-indentified patent and that said Letters Patent is hereby corrected as shown below:

Column 13, line 37, change "mice" to --mica--.

Signed and Sealed this

Seventh Day of February, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,264,174
DATED : November 23, 1993
INVENTOR(S) : Takei et al.

It is certified that error appears in the above-indentified patent and that said Letters Patent is hereby corrected as shown below:

On title page,

Item [73] ASSIGNEE, line 1,
please change "Mitsubishi Denki Kabushiki Kaisha" to
--Chisso Corporation--
and in line 2, please change "Tokyo, Japan" to
--Osaka, Japan--

Signed and Sealed this

Second Day of January, 1996

Attest:

BRUCE LEHMAN

Attesting Officer

Commissioner of Patents and Trademarks